Figure 1:
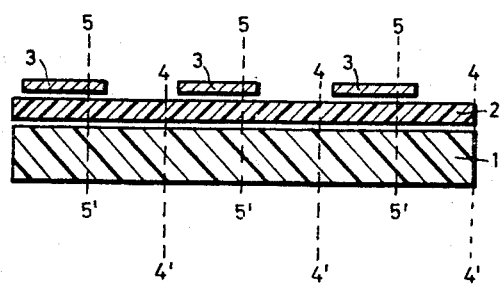

Oct. 4, 1966   F. GAENGE   3,276,932
METHOD OF MAKING WRAPPED THIN-FOIL CAPACITORS
Filed Jan. 25, 1962

United States Patent Office 3,276,932
Patented Oct. 4, 1966

3,276,932
METHOD OF MAKING WRAPPED THIN-FOIL
CAPACITORS
Fritz Gaenge, Munich, Germany, assignor to Siemens & Halske Aktiengesellschaft, Berlin and Munich, a corporation of Germany
Filed Jan. 25, 1962, Ser. No. 168,691
Claims priority, application Germany, Feb. 15, 1961, S 72,537
2 Claims. (Cl. 156—191)

The invention disclosed herein is concerned with a method of making wrapped thin-foil capacitors the dielectric of which is produced by placing upon a carrier band a varnish layer and vaporizing upon such varnish layer the metallic coating.

Upon metallizing a thin foil by vaporizing thereon, in a vacuum, a metal layer, for example, an aluminum layer, to serve as the metallic coating of a capacitor, there will be produced metallic points by the metal entering into surface pores, such internal metal points detrimentally affecting the insulating properties of the foil and therewith the breakdown strength of the capacitor made therefrom.

It has been proposed to remedy this drawback, so as to improve the breakdown strength, by first providing on the carrier foil a varnish layer forming only part of the total thickness of the dielectric, thereupon vaporizing on such first varnish layer a metal layer, and thereafter placing upon this metal layer a second varnish layer. This second varnish layer will be free of internal metal points, the resulting structure thus providing a greater breakdown strength with identical total thickness of the dielectric as in a thin foil capacitor having an unbroken dielectric layer. However, the process requires two separate varnishing operations between which is carried out the metallizing in a vacuum, thus resulting in increased work and therewith raising the costs of the product.

In accordance with the present invention, the same desired increased breakdown strength can be obtained with reduced expenditure, by placing the varnish layer upon a carrier band with a width several times that of a capacitor wrap, thereupon metallizing upon such varnish layer preferably a plurality of laterally spaced apart strips, the width of each metal strip corresponding approximately to the width of a capacitor wrap, and thereafter cutting the varnished carrier foil to form bands with a width corresponding to about twice the width of a capacitor wrap, each such band thus carrying a varnish layer and a metal strip which is laterally displaced thereon toward one edge thereof, whereupon the thin foil strip (varnish layer with metal strip) is removed from the respective carrier band and folded upon itself along its longitudinal median line, thereby producing a two-layer dielectric with a metallic coating along the major part of one layer. At least two such folded thin foil strips are wound to form a capacitor wrap.

The method according to the invention results primarily in a considerable simplification and cost reduction in the fabrication. The non-metallized layer of the dielectric is completely free of internal metal points and therefore has great breakdown strength. A further advantage can be obtained in simple manner by making the metal coating somewhat wider than a capacitor wrap so that part of such coating will overlap the dielectric band at the folding edge thereof at which is effected the contacting.

Further details of the invention will appear from the description thereof which is rendered below with reference to the accompanying drawing.

Figure 2:
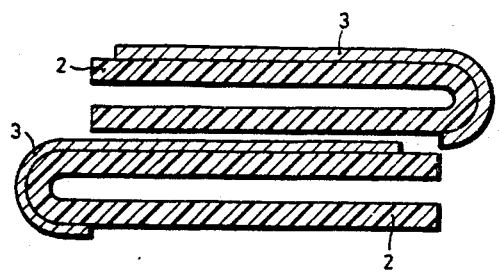

FIG. 1 explains the manner of varnishing a relatively wide carrier band and of providing on the varnish layer a plurality of laterally spaced apart metal strips; and FIG. 2 shows two folded thin foil strips in position for winding to form a capacitor wrap.

Referring now to FIG. 1, numeral 1 indicates a carrier band upon which is provided a varnish layer 2 which is to form part of the thin foil. Upon the varnish layer 2 are provided metal strips 3, for example, by vaporization, which is done, for example, with the aid of suitable masking. The resulting structure is cut along lines 4, 4' to produce individual thin foil strips, each individual strip comprising a thin varnish foil and a metal coating provided thereon. Each individual strip is thereupon folded upon itself along the longitudinal median lines 5, 5', with the metal coating 3 facing outwardly, thus producing a two-layer dielectric carrying a metallic coating.

FIG. 2 shows two such folded thin foil strips each having a two-layer dielectric 2 and a metal coating 3. Each metal coating 3 overlaps the folding edge of its respective thin foil dielectric strip 2, thus providing for the contacting, which is effected by metal spraying, not only an edge of the corresponding metal coating but part of the surface thereof.

Changes may be made within the scope and spirit of the appended claims which define what is believed to be new and desired to have protected by Letters Patent.

I claim:

1. A method of making wrapped thin-foil capacitors, comprising the steps of placing upon a suitable carrier band a varnish layer with a width which is several times the width of a capacitor wrap, such varnish layer representing the dielectric of capacitors to be formed, metallizing upon said varnish layer a plurality of laterally spaced apart strips which are to represent the metal coatings of capacitors to be formed, each metal strip having a width which corresponds approximately to the width of a capacitor wrap, cutting said carrier band with the varnish layer and the metal strips provided thereon to form individual bands with a width corresponding approximately to twice the width of a capacitor wrap, removing from the respective individual carrier band the thin-foil strip carried thereby which comprises the varnish layer and a metal strip disposed thereon, folding the respective thin-foil strip upon itself along the longitudinal median line thereof, and assembling at least two such folded strips to form a wound capacitor therefrom.

2. A method according to claim 1, wherein the metal coating overlaps the folded edge of the dielectric band at which is effected the contacting.

References Cited by the Examiner
UNITED STATES PATENTS 2,728,036 12/1955 Steiner et al. _____ 317—261 X
3,012,176 12/1961 Williams et al. ____ 317—261 X EARL M. BERGERT, *Primary Examiner.*

J. J. BURNS, *Assistant Examiner.*